(12) United States Patent
Higuchi

(10) Patent No.: US 8,300,903 B2
(45) Date of Patent: Oct. 30, 2012

(54) IMAGING APPARATUS AND METHOD FOR AUTHENTICATION OF USER

(75) Inventor: Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 798 days.

(21) Appl. No.: 12/355,985

(22) Filed: Jan. 19, 2009

(65) Prior Publication Data

US 2009/0185726 A1    Jul. 23, 2009

(30) Foreign Application Priority Data

Jan. 21, 2008  (JP) .................................. 10999/2008

(51) Int. Cl.
 *G06K 9/00* (2006.01)
(52) U.S. Cl. ........ 382/124; 382/218; 382/126; 382/115; 382/116
(58) Field of Classification Search .................. 382/124, 382/218, 126, 115, 116
See application file for complete search history.

(56) References Cited

U.S. PATENT DOCUMENTS

2008/0107309 A1* 5/2008 Cerni ............................ 382/115

FOREIGN PATENT DOCUMENTS

| JP | 1995021373 A | 1/1995 |
| JP | 2003085538 A | 3/2003 |
| JP | 2006107401 A | 4/2006 |

OTHER PUBLICATIONS

English translation of JP office action in JP counterpart patent application, dated Aug. 20, 2012.

* cited by examiner

*Primary Examiner* — Matthew Bella
*Assistant Examiner* — Ruiping Li

(57) ABSTRACT

The imaging apparatus for recognizing an image of the present invention determines for recognition a user by imaging a recognition pattern of a palm or a finger. The imaging apparatus for recognizing an image comprising a palm guide unit for guiding an imaging area of a palm, a finger guide unit for guiding an imaging area of a finger, and an imaging unit for imaging biometric data of the imaging areas of the palm and finger.

12 Claims, 6 Drawing Sheets

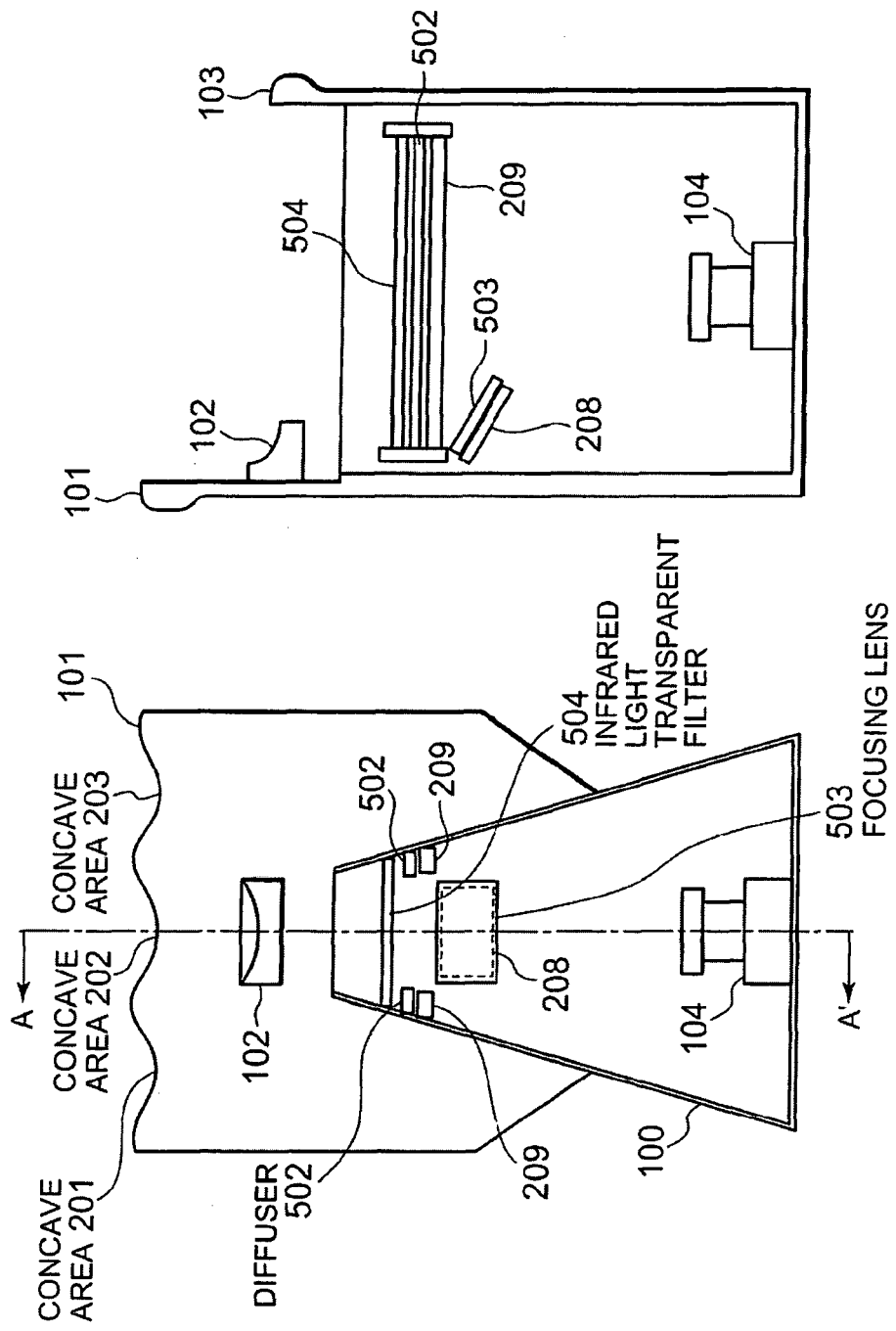

IMAGING APPARATUS AND METHOD FOR AUTHENTICATION OF USER

This application is based upon and claims the benefit of priority from Japanese patent application No. 2008-010999, filed on Jan. 21, 2008, the disclosure of which is incorporated herein in its entirety by reference.

BACKGROUND OF THE INVENTION

The present invention relates to an imaging apparatus for recognizing an image for determining a user on the basis of biometric characteristic data collected by imaging a hand.

In the biometric characteristic data authenticating technology for recognizing a user by extracting an image of a finger, a system has been introduced to match a pattern of the finger skin such as a fingerprint or a blood vessels pattern against the previously-stored data. Moreover, even in the biometric data authenticating technology for recognizing a user using a palm image, a system is also proposed to match a pattern on the skin surface such as a palmar print or a blood vessels pattern of a palm against the previously-stored data. For example, for an automatic teller machine (ATM) installed at a bank, a user is authenticated using biometric characteristic data of a finger or a palm.

Meanwhile, a user tends to avoid use of the method required to image and input biometric characteristic data using a contact type imaging apparatus before use of ATM that may be used by many persons. The reason is that a user is requested to touch on a contact type apparatus that on which many other persons have touched.

Accordingly, the JP-A No. 2003-85538 discloses, as the technical document of a related art, a method for using a fingerprint of a finger as the biometric characteristic data as the technology related to a non-touch type biometric data imaging apparatus.

Moreover, JP-A No. H07(1995)-21373 discloses a method for using blood vessels of fingers as the biometric characteristic data.

In addition, JP-A No. 2006-107401 discloses a method for using blood vessels of a palm as the biometric data.

However, in the patent documents listed above, an imaging apparatus for recognizing an image respectively uses different optical systems and imaging units. Therefore, when the technology for authenticating a plurality of biometric characteristic data such as a fingerprint and a palmar print is considered, the imaging apparatus for recognizing an image is required to use a plurality of input devices and imaging units. As a result, an imaging apparatus for recognizing an image has a problem that it is difficult to realize reduction in size and manufacturing cost.

SUMMARY OF THE INVENTION

An object of the present invention is to provide a highly accurate imaging apparatus for recognizing an image for authentication of a user.

According to one aspect of the present invention, an imaging apparatus for recognizing an image is provided which includes:

an imaging unit including a palm guide unit for guiding an imaging area of a palm, a finger guide unit for guiding an imaging area of a finger, and an imaging unit for imaging biometric data of the imaging area of the palm and the finger.

According to one aspect of the present invention, an imaging method for recognizing an image is provided which includes:

a finger imaging step for imaging an imaging area of a finger guided with the finger guide unit, a finger image matching step for matching an imaged finger data against previously-stored data of finger image, a palm imaging step for imaging an imaging area of a palm guided with the palm guide unit, a palm image matching step for matching the imaged data of a palm against previously stored data of palm image, and an authentication determining step for recognizing and determining a user based on the result of matching data.

According to one aspect of the present invention, a computer readable medium recording thereon a program for enabling computer to execute;

a finger imaging function for imaging an imaging area of a finger guided with the finger guide unit, a finger image matching function for matching an imaged finger data against previously stored data of finger image, a palm imaging function for imaging an imaging area of a palm guided with the palm guide unit, a palm image matching function for matching an imaged data of a palm against previously stored data of palm image, and an authentication determining function for recognizing a user on the basis of the result of matching data.

BRIEF DESCRIPTION OF THE DRAWINGS

Other features and advantages of the invention will be made more apparent by the following detailed description and the accompanying drawings, wherein:

FIGS. 2(A) and 2(B) show internal structures of FIG. 1, wherein FIG. 1(A) is a vertical cross-sectional view including an imaging unit and FIG. 2(B) is a cross-sectional view along the line A-A in FIG. 2(A);

FIGS. 6(A) and 6(B) show internal arrangement in the second exemplary embodiment of the imaging apparatus for recognizing an image in the present exemplary embodiment, wherein FIG. 6(A) is a vertical cross-sectional view including an imaging unit and FIG. 6(B) is a cross-sectional view along the line A-A in FIG. 2(A).

In the drawings, the same reference numerals represent the same structural elements.

DETAILED DESCRIPTION OF THE PREFERRED EMBODIMENTS

A first embodiment of the present invention will be described in detail below.

Figure 1:
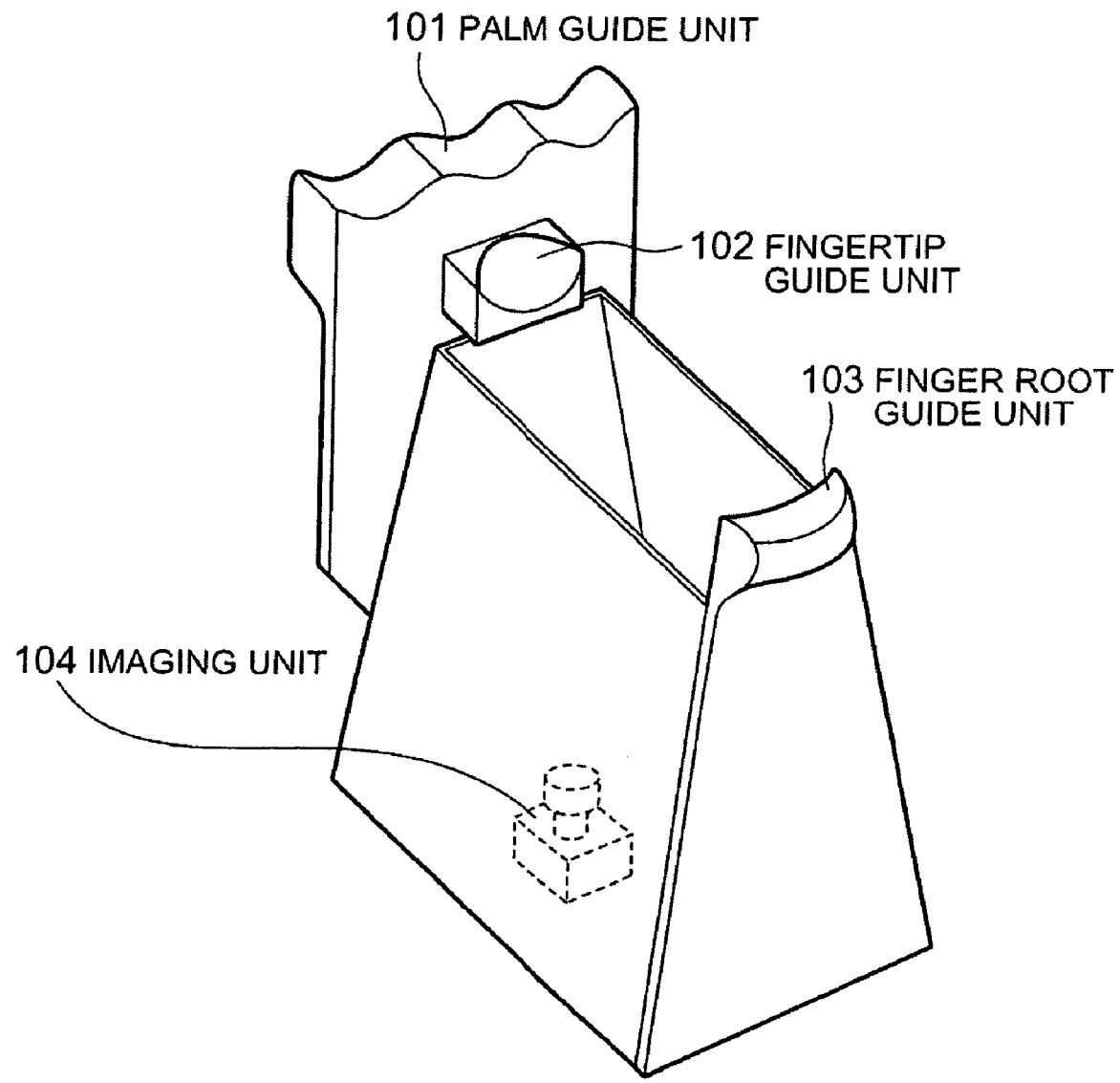
FIG. 1 is a schematic structural perspective view showing the first exemplary embodiment of an imaging apparatus for recognizing an image of the present exemplary embodiment.

With reference to FIG. 1, a biometric characteristic data imaging apparatus of the present exemplary embodiment (hereinafter referred to as "imaging apparatus") will be explained. Imaging apparatus 100 is provided with imaging unit 104 such as a camera or the like provided within imaging apparatus 100. Imaging apparatus 100 includes fingertip guide unit 102 and finger root guide unit 103 for guiding an imaging area of a fingerprint and/or a finger blood vessels pattern to the suitable location for imaging. Moreover, imaging apparatus 100 also includes a palm guide unit 101 for guiding a palm to the location suitable for imaging of a palmar print and/or a palm blood vessels pattern. These guide units are provided at an upper part of imaging apparatus 100.

Here, a fingertip of a user is placed on fingertip guide unit 102 and a finger root of the same finger on finger root guide unit 103 for the imaging of a finger. Thereby, the finger of user is guided to the adequate location for imaging unit 104 for imaging of the finger. Moreover, for the imaging of a palm, the palm of the user is also placed on palm guide unit 101. Thereby, the palm of the user is guided to the suitable location for imaging unit 104 for the imaging of the palm.

In other words, fingertip guide unit 102 and finger root guide unit 103 guide an imaging area of the finger to provide the imaging area of finger lying on the extended line in the imaging direction of imaging unit 104. In the same manner, palm guide unit 101 guides an imaging area of the palm to provide the imaging area lying on the extended line in the imaging direction of imaging unit 104.

Location of imaging area of the palm guided with palm guide unit 101 is set in the side becoming far from imaging unit 104 more than the location of the imaging area of the finger guided with fingertip guide unit 102 and finger root guide unit 103. For example, palm guide unit 101 is located at the place further than fingertip guide unit 102, finger root guide unit 103 in the imaging direction of imaging unit 104. As a result, location of the guided finger is selected between the location of guided palm and imaging unit 104.

Accordingly, since location of imaging area of the guided palm up to imaging unit 104 becomes longer than that of the guided finger, the palm can be imaged in the range wider than the imaging area of the finger. Therefore, recognition accuracy of image by using a palm image can be improved.

Moreover, fingertip guide unit 102, finger root guide unit 103 and palm guide unit 101 are arranged to set locations of the imaging areas of the guided finger and palm to overlap in vertical. As a result, an area occupied with imaging apparatus 100 can be set small. Therefore, cost and space required for installation of the imaging apparatus can be reduced.

Figure 4:
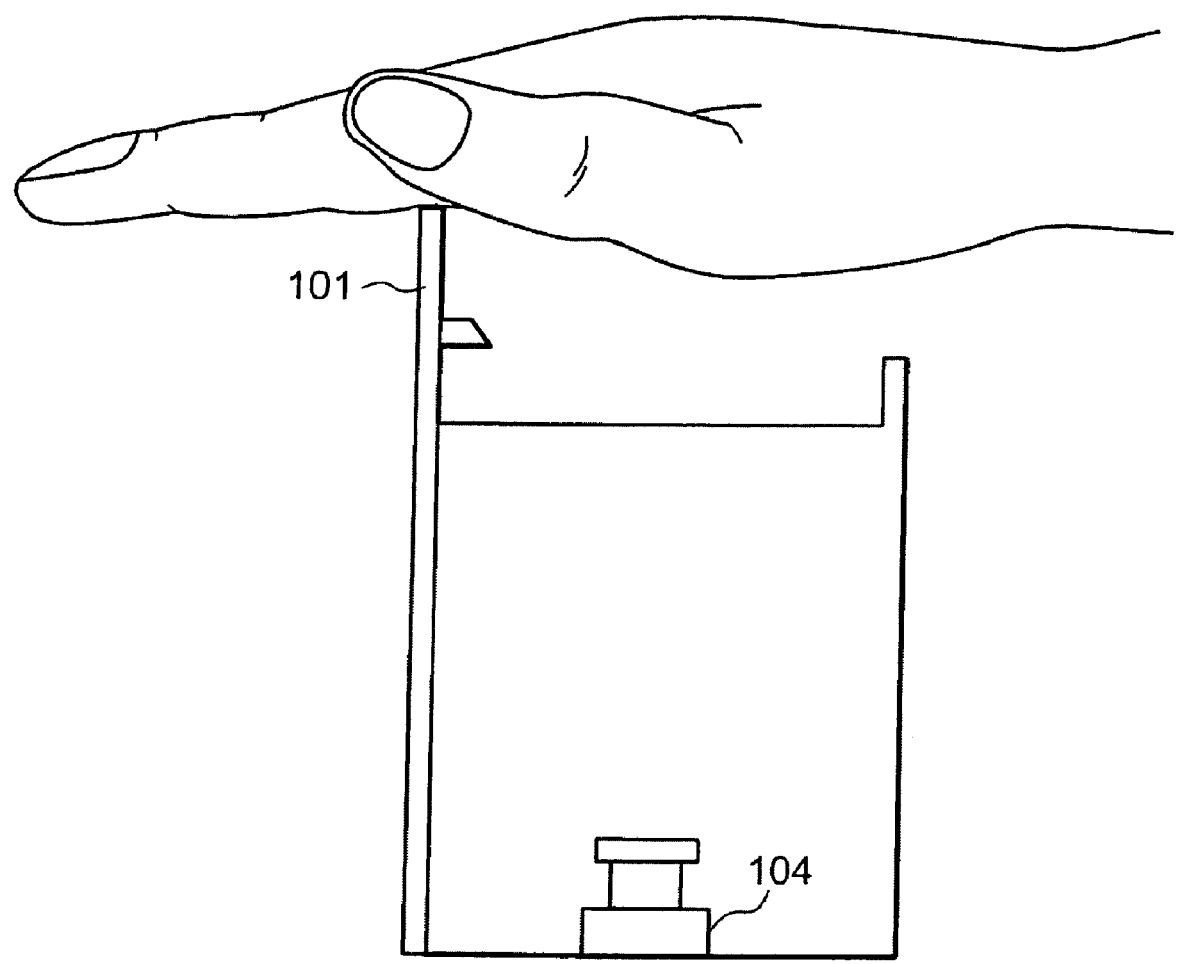
FIG. 4 is a side view during imaging of a palm in the imaging apparatus for recognizing an image in the present exemplary embodiment.

Palm guide unit 101 includes concave areas 201, 202, and 203. When it is requested to obtain images of palmar print and blood vessels of palm using imaging unit 104, the root portions of three fingers of a hand of the user (index finger, middle finger, and third finger) are placed on these concave areas as shown in FIG. 4. As a result, an imaging area of the palm is guided and imaging unit 104 can image the imaging area of palm.

Figure 5:
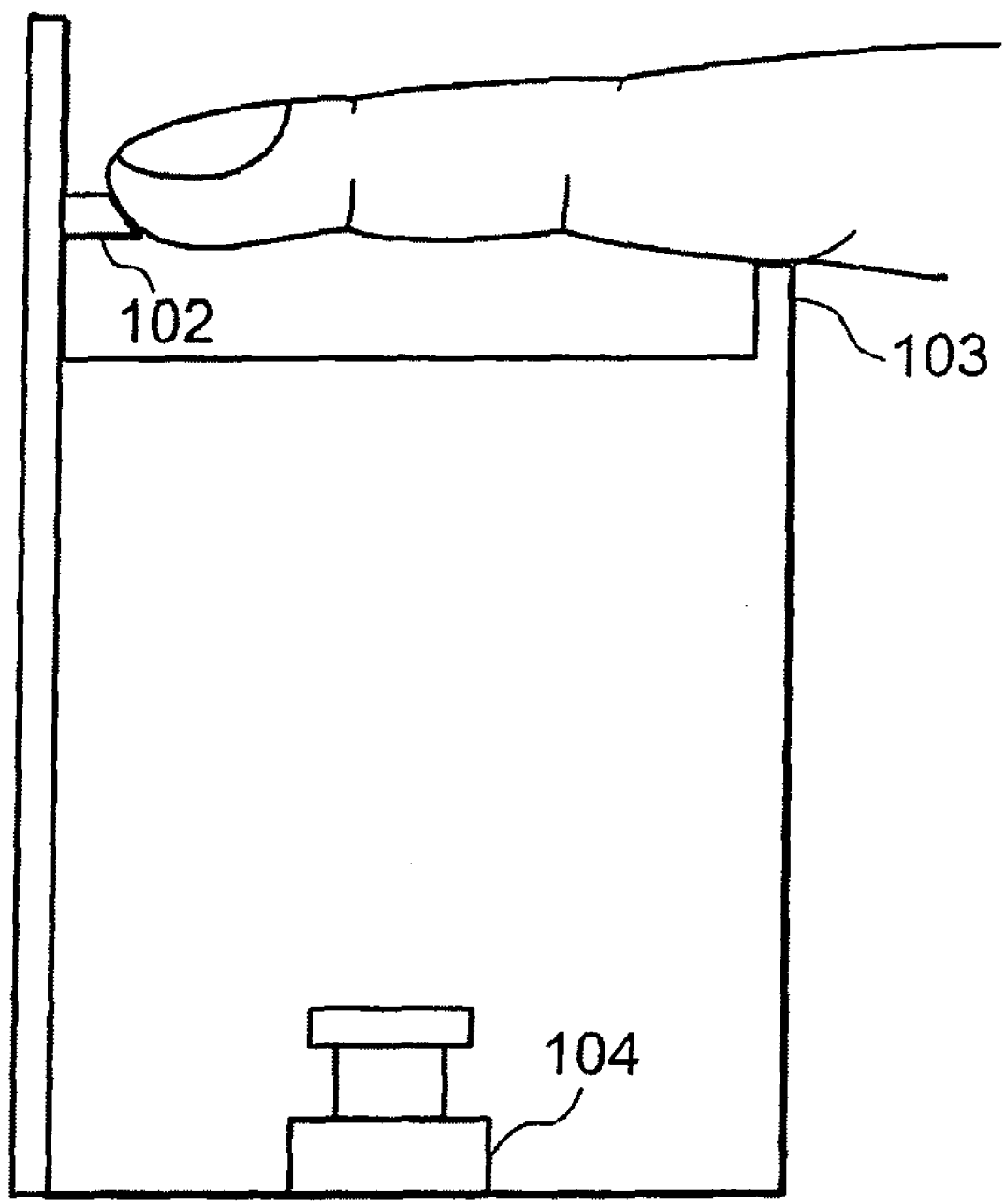
FIG. 5 is a side view during imaging of a finger in the imaging apparatus for recognizing an image of the present exemplary embodiment.

Fingertip guide unit 102 and finger root guide unit 103 guide a finger of user. When imaging unit 104 images a fingerprint and a blood vessel pattern of a finger of user, the fingertip is placed on the fingertip guide unit 102 and the finger root on finger root guide unit 103 as shown in FIG. 5. As a result, the imaging area of finger is guided and the imaging unit 104 can image the imaging area of finger.

Figure 2:
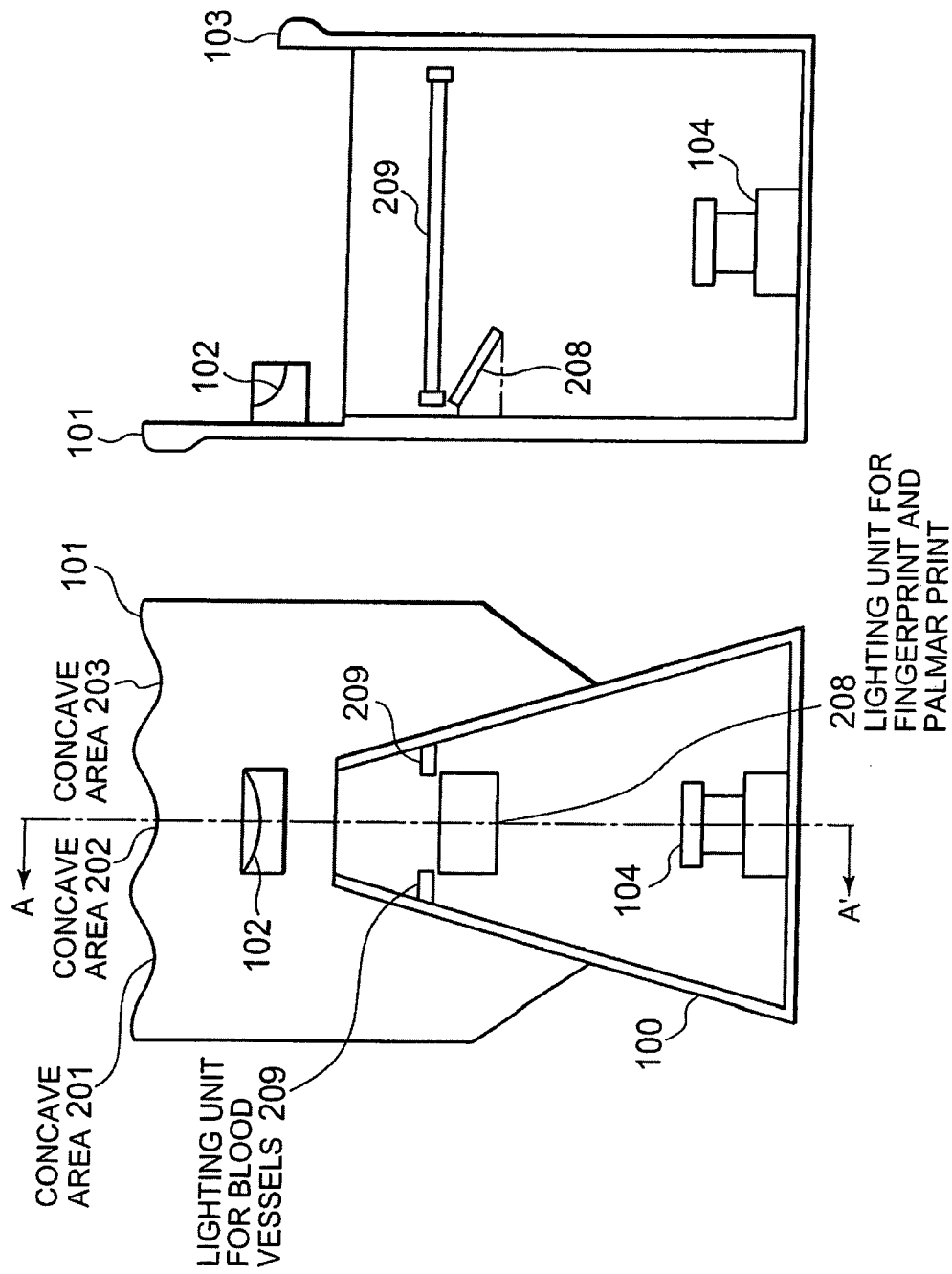

Here, a vertical cross-sectional view including imaging unit 104 of imaging apparatus 100 is shown in FIG. 2(A) and a cross-section along the line A-A in FIG. 2(A) is shown in FIG. 2(B).

Here, lighting unit 208 for fingerprint and palmar print is a plane lighting unit and is arranged in a single surface side of the fingertip side of apparatus (front surface side). Lighting unit 208 for fingerprint and palmar print is lighted for imaging a fingerprint or a palmar print to irradiate the fingerprint of a finger or the palmar print of a palm. Since lighting unit 208 for fingerprint and palmar print images a fingerprint or a palmar print that is formed by concave and convex areas on the surface of skin, the lighting unit preferably radiates the light from a single direction, because it is desirable that shadows are made by the concave and convex areas on the surface of skin.

As lighting unit 208 for fingerprint and palmar print, the lighting unit emitting the light in short wavelength is desirable, because this light cannot easily image blood vessels. Considering the effect attained by removing disturbed lights, lighting unit 208 for fingerprint and palmar print may emit the light in the wavelength band of the near infrared light just like lighting unit 209 for blood vessels. In the case where the exclusive lighting unit for fingerprint and palmar print is arranged to radiate the light only from a single direction under the condition that lighting unit 208 for fingerprint and palmar print and lighting unit 209 for blood vessels provide the light in the identical or similar long wavelength band, sufficient contrast can be obtained. In addition, with processing the imaged data, influence of external lights that may prevent recognition of fingerprint and palmar print can be limited.

Lighting unit 209 for blood vessels is respectively arranged in the internal sides at the right and left side surfaces of the apparatus. Lighting unit 209 for blood vessels radiates the near infrared light to the guided finger and palm on the occasion of imaging the blood vessels of a finger or a palm.

In addition, on the occasion of imaging blood vessels patterns of a finger and a palm, lighting unit 209 for blood vessels radiates the light from two directions in both sides of the finger and palm as the imaging object in order to prevent shadows of fingerprint and palmar print formed by the concave and convex areas on the surface of skin appearing on the imaged data as much as possible.

Imaging unit 104 has functions to respectively image a fingerprint, a finger blood vessels pattern or a palmar print and a palm blood vessels pattern and also generate respective image data.

Here, imaging unit 104 is constituted with an image sensor such as CCD and CMOS, a control system, and a lens optical system for focusing images of a finger and a palm to the image sensor, etc. Moreover, imaging unit 104 also includes an AD converter for converting an image focused on the image sensor by imaging into an image data.

Moreover, imaging unit 104 has a finger imaging mode to which adequate focal distance and shutter speed or the like for imaging a finger are preset and a palm imaging mode to which adequate focal distance and shutter speed or the like for imaging a palm.

Figure 3:
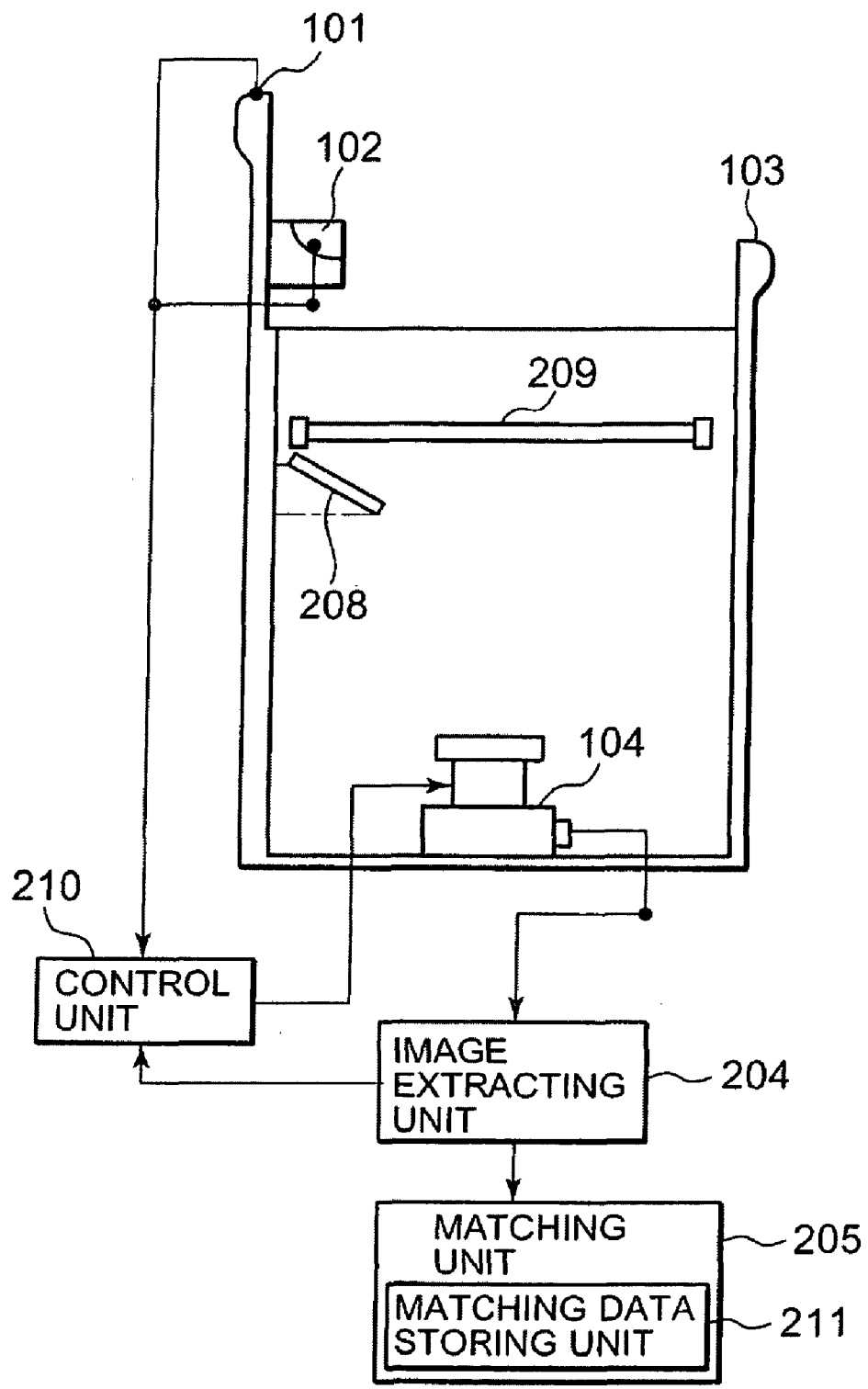
FIG. 3 is a schematic block diagram showing an internal structure of an imaging apparatus for recognizing an image of the present exemplary embodiment.

In addition, imaging apparatus 100 is connected to imaging unit 104 as shown in FIG. 3. Imaging apparatus 100 includes image extracting unit 204 for extracting image data generated by imaging unit 104, matching unit 205 for storing image characteristic data such as predetermined fingerprint, palmar print, and blood vessel pattern, and control unit 210 for controlling imaging mode of imaging unit 104 connected to imaging apparatus 100.

Image extracting unit 204 extracts fingerprint, palmar print and image characteristics of finger and palm blood vessels from the image data extracted from imaging unit 104. Image extracting unit 204 has an image characteristic extracting function to send the extracted image characteristic data to matching unit 205.

Here, image extracting unit 204 is composed of a microprocessor or the like. Image extracting unit 204 extracts a fingerprint, a palmar print, and an image of blood vessels.

Matching unit 205 has an image data matching function for matching image characteristic data sent from image extracting unit 204 on the basis of the previously stored image characteristic data.

Control unit 210 is connected, as shown in FIG. 3, to imaging unit 104 and has an imaging mode control function for controlling imaging mode of imaging unit 104.

Here, control unit 210 has a gradation mode switching function for switching the imaging mode of imaging unit 210 based on the image data sent from image extracting unit 204. In this case, control unit 210 collects imaged data and checks gradation of a preset pixel or a plurality of different pixels within the image data. Accordingly, the focused image is determined as a finger image or a palm image.

For example, control unit 210 collects gradation of several pixels at the part deviated to any of the right and left sides of the collected image on the basis of the image data. Control unit 210 determines, in the case where gradation completely indicates "black", that the collected image is an image of a finger where only the center of image is focused.

Moreover, control unit 210 determines, in the case where preset pixels show completely "white", that the entire part of image data is focused in the image. Therefore, this image can be determined as the image of a palm having a wider focusing area.

Whether an imaging object is a palm or a finger can be determined as explained above and it is also possible to switch the imaging mode of imaging unit 104 to the imaging mode just suitable for the imaging object.

In addition, control unit 210 includes a guide detecting unit connected to palm guide unit 101 and fingertip guide unit 102 to detect, for example, via a sensor the conditions that the finger root is placed on palm guide unit 101, namely that palm guide unit 101 guides the palm. Further, when it is detected that the palm is placed on the palm guide unit, the imaging object may be determined as a palm and the imaging mode of imaging unit 104 may also be switched to the imaging mode suitable for the imaging object (palm).

Moreover, for example, control unit 210 detects, when the fingertip is placed on the finger guide unit 102, in other words, when the finger guide unit 102 guides a finger, this condition with the guide detecting unit to determine that the imaging object is a finger. Here, it is also possible to switch (change) the imaging mode of imaging unit 104 to the mode suitable for the imaging object (palm).

Accordingly, imaging apparatus 100 can image a fingerprint, a palmar print, a finger blood vessels pattern and a palm blood vessels pattern in order to effectively acquire security for recognition of a user.

Meanwhile, it is also possible to provide a small-sized and low price biometric characteristic data imaging apparatus that can image and determine for authentication the biometric characteristic data of a fingerprint, blood vessels of a finger, palmar print and blood vessels of a palm with only one imaging unit.

Moreover, influence on determination for recognition generated by appearing of characteristics and tendencies of image data which are different for each imaging unit used for imaging can be suppressed by imaging a plurality of different biometric characteristic data with the same imaging unit 104.

Next, operations of the biometric characteristic data imaging apparatus 100 constituted as explained above will then be explained.

First, an imaging area of a palm guided with the palm guide unit 101 is imaged in a palm imaging step. The imaged data obtained by the imaging is matched against the previously stored palm image in a palm image matching step. Next, the imaging mode preset in the imaging unit is switched to a finger imaging mode for imaging a finger from the palm imaging mode for imaging a palm in an imaging mode switching step. Next, an imaging area of a finger guided with the fingertip guide unit 102 and the finger root guide unit 103 is imaged in a finger imaging step. The imaged finger data obtained by the imaging is matched against the previously stored finger image in a finger image matching step. A user is authenticated and determined based on matching result of the finger image and the palm image in an authentication determining step.

Here, execution contents of the palm image matching step, palm imaging step, imaging mode switching step, finger imaging step, finger image matching step, and authentication determining step may be programmed in a computer executable format.

Next, operations of imaging apparatus 100 of the exemplary embodiment explained above will be explained below in details.

First, a palm is set to imaging apparatus 100 as shown in FIG. 4 for imaging of a palmar print and a palm blood vessels pattern. Here, the palm is guided to the predetermined position with palm guide unit 101.

Here, in the case of imaging a palmar print and a blood vessels pattern of a palm, a user places the finger root portions of the three fingers (index finger, middle finger, and third finger) of a palm in preset concave areas 201, 202, and 203 of palm guide unit 101.

In this case, imaging unit 104 is set to the palm imaging mode to image the guided palm (palm imaging step).

Here, control unit 210 (FIG. 2) detects that the finger root is placed on the palm guide unit 101 and a palmar print of the guided palm and a finger blood vessels pattern may be imaged with imaging unit 104 by setting imaging unit 104 to the palm imaging mode.

Imaging unit 104 images the palm guided with palm guide unit 101, control unit 210 collects the gradation data of the particular pixels in the imaged palm data and determines whether the image data shows the image of the palm based on the gradation data. As a result, it is also possible that control unit 210 switches imaging unit 104 to the finger imaging mode and imaging unit 104 is set to image a palmar print and a palm blood vessels pattern of the guided palm.

Next, imaging unit 104 sends the palmar print and palm blood vessels pattern images of the focused palm to image extracting unit 204.

Image extracting unit 204 extracts image characteristic data of palmar print and palm blood vessels pattern based on the image data from imaging unit 104 and sends this image characteristic data to matching unit 205.

Matching unit 205 matches the image characteristic data against the image characteristic data such as previously stored fingerprint, palmar print, and blood vessels pattern (palm image matching step).

Next, a fingerprint and a finger blood vessels pattern are imaged.

First, a user places a finger on fingertip guide unit 102 and finger root guide unit 103 as shown in FIG. 5 to image the fingerprint and finger blood vessels pattern of the finger. Therefore, the finger placed on the fingertip guide unit 102 and the finger root guide unit 103 is guided to the optimum position for imaging.

Here, control unit 210 detects that the finger has been placed on the fingertip guide unit 102 and the finger root guide unit and it is also possible by the setting that imaging unit 104 is switched to the finger imaging mode, and this imaging unit images the fingerprint and finger blood vessels pattern of the guided finger.

Moreover, imaging unit 104 images an image of the finger placed on the fingertip guide unit 102 and the finger root guide unit 103, and control unit 210 determines that the imaged data shows the image of finger on the basis of gradation of the particular pixels in the imaged data. Next, setting also enables that control unit 210 switches imaging unit 104 to the finger imaging mode and imaging unit 104 images the fingerprint and finger blood vessels pattern of the guided finger.

Here, a longer time may be required for the matching step, because the image data of the palm sent to matching unit 205 is larger than the image data of the finger. Therefore, the allowable setting is that the fingerprint and finger blood vessels pattern of the finger are imaged (finger imaging step) during extraction of the palmar print data of the palm. Accordingly, the total time required for recognition can be reduced.

Next, imaging unit 104 sends the palmar print and palm blood vessels pattern of the focused palm to image extracting unit 204 as the image data. Image extracting unit 204 extracts image characteristic data of the fingerprint and finger blood vessels pattern based on the image data sent from imaging unit 104 and transmits this image characteristic data to matching unit 205.

Matching unit 205 matches the fingerprint and finger blood vessels pattern previously stored in matching data storing unit 211 against the image characteristic data transmitted to execute determination for recognition (authentication determining step) of a user. Here, it is also possible by the setting that recognition is determined when the fingerprint, blood vessels patterns of finger and palm, for example, are completely matched.

As explained above, in the present invention, biometric characteristic data of finger and palm can be imaged only with imaging unit and therefore the present invention can provide a biometric characteristic imaging apparatus having the recognition accuracy higher than that of an existing authentication system utilizing a single biometric characteristic data. Moreover, since biometric characteristic data of the finger and palm can be imaged only with imaging unit 104, the imaging apparatus that is smaller in size and lower in price than the apparatus including a plurality of imaging apparatuses of the related art can be provided.

A second embodiment of the present invention will be described in detail below.

Here, the same reference numerals as that in the first exemplary embodiment represent the same structural elements.

The second exemplary embodiment has almost the identical structure in the system structure to that of the first exemplary embodiment explained above (FIG. 1) and is further provided with diffuser 502, focusing lens 503, and infrared light transparent filter 504. Therefore, biometric characteristic data of fingerprint and blood vessels pattern of the finger and palmar print and blood vessels pattern of the palm can be imaged in higher image quality with imaging unit 104.

First, in this exemplary embodiment, focusing lens 503 is provided at the upper part of the lighting unit 208 for fingerprint and palmar print as shown in FIG. 6(A) and FIG. 6(B). Accordingly, the light radiated to the guided finger or palm from the lighting unit 2 for fingerprint and palmar print can be polarized to almost the parallel light. Therefore, focusing lens 503 can easily form shadows of the fingerprint and palmar print formed of concave and convex areas of skin and can intensify contrast of the fingerprint and palmar print.

In addition, diffuser 502 is set just above the respective lighting unit 209 for blood vessels. As a result, the projected light can be diffused making it difficult, on the occasion of imaging a blood vessels image of the finger of palm, to generate shadows of fingerprint and palmar print formed of concave and convex areas of skin. Namely, a more detail image of only the blood vessels can be imaged.

In this exemplary embodiment, as explained above, the optimum lighting unit can be selected for imaging of the fingerprint and palmar print and for imaging of only the blood vessels. Thereby, the most adequate condition of the light can be obtained and moreover, highly sophisticated determination for authentication of a user can be made.

Moreover, as lighting unit 209 for blood vessels, an LED having the wavelength characteristic in the near infrared light in the wavelength of about 850 to 960 nm is desirable, when it is considered to intensify contrast that is lowered due to absorption by hemoglobin in the blood vessels and resistance for contamination and disturbed lights. Further, in this exemplary embodiment, infrared light transparent filter 504 may be arranged just above the lighting unit in view of transmitting this wavelength and removing the disturbed light of the other wavelengths.

Also, as the lighting unit 208 for fingerprint and palmar print, it is preferable to use an LED having the wavelength characteristic of the near infrared light in the wavelength of about 850 to 960 nm. Moreover, adverse effect of disturbed lights can be suppressed and contamination of a lens of imaging unit 104 due to deposition of dust within imaging apparatus 100 can also be controlled by arranging the infrared light transparent filter 504.

While this invention has been described in conjunction with the referred embodiments described above, it will now be possible for those skilled in the art to put this invention into practice in various other manners.

What is claimed is:

1. An imaging apparatus for recognizing an image comprising:
    a palm guide unit for guiding a palm to an imaging area of the palm;
    a finger guide unit for guiding a finger to an imaging area of the finger; and
    an imaging unit for imaging biometric data of said imaging area of the palm and the finger;
    wherein said imaging area of a finger is located between said imaging unit and said imaging area of the palm.

2. The imaging apparatus according to claim 1, further comprising:
    a switching unit for switching imaging mode, said imaging mode including finger imaging mode and palm imaging mode.

3. The image apparatus according to claim 2, further comprising:
    a collecting unit for collecting gradation data of predetermined imaging area, wherein said switching unit switches modes based on said gradation data.

4. The image apparatus according to claim 2, further comprising:
    a detecting unit for detecting whether said palm guide unit guides the palm to said imaging area of the palm, wherein said switching unit switches the imaging mode to said palm imaging mode in case said detecting unit detects said palm guide unit guides the palm to said imaging area of the palm.

5. The image apparatus according to claim 2, further comprising:
    a first light unit for lighting said imaging area of the finger or palm for imaging fingerprint and palmar print.

6. The image apparatus according to claim 5, further comprising:
    a second lighting unit for lighting blood vessels of said imaging area of the finger or palm by near infrared light.

7. The image apparatus according to claim 6, further comprising:

an extracting unit for extracting the data of fingerprint pattern, finger's blood vessel pattern, palmar print pattern, and palm's blood vessel pattern from finger print image, finger's blood vessel image, palm image, and palm's blood vessel image imaged by said imaging unit.

8. The image apparatus according to claim 7, further comprising:
- a storing unit for storing the data of finger print pattern, finger's blood vessel pattern, palmar print pattern, and palm's blood vessel pattern; and
- a matching unit for matching said extracted data and said stored data.

9. A method for recognizing an image comprising:
- (a) imaging an imaging area of palm, said imaging area of palm guided by an palm guide unit;
- (b) matching the imaged palm data against stored palm data in a storing unit;
- (c) imaging an imaging area of finger, said imaging area of finger guided by a finger guide unit and located between an imaging unit and said imaging area of palm;
- (d) matching the imaged finger data against stored finger data in said storing unit; and
- (e) authenticating a user based on matched results of step (b) and/or step(d).

10. The method according to claim 9, further comprising:
- (f) switching imaging mode from palm imaging mode to finger imaging mode after said step (b).

11. A non-transitory computer readable storage medium embodying a program, said program causing an apparatus to perform a method, said method comprising:
- (a) imaging an imaging area of palm, said imaging area of palm guided by a palm guide unit;
- (b) matching the imaged palm data against stored palm data in storing unit;
- (c) imaging an imaging area of finger, said imaging area of finger guided by an finger guide unit and located between an imaging unit and said imaging area of palm;
- (d) matching the imaged finger data against stored finger data in storing unit; and
- (e) authenticating a user based on the matched results.

12. The non-transitory computer readable storage medium embodying a program according to claim 11, said program causing an apparatus to perform a method, said method further comprising:
- (f) switching the imaging mode from palm imaging mode to finger imaging mode.

\* \* \* \* \*